(12) United States Patent
Hebsur et al.

(10) Patent No.: US 10,642,528 B1
(45) Date of Patent: May 5, 2020

(54) SYSTEM AND METHOD OF BACKUP GROUPING WITH IMPROVED COMPUTATIONAL EFFICIENCY

(71) Applicant: EMC IP Holding Company LLC, Hopkinton, MA (US)

(72) Inventors: Sudha Vamanraj Hebsur, Bangalore (IN); Aaditya Rakesh Bansal, Bangalore (IN); Shelesh Chopra, Bangalore (IN); Sunil Yadav, Bangalore (IN); Manish Sharma, Bangalore (IN); Hareej G. Hebbur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 16/164,081

(22) Filed: Oct. 18, 2018

(51) Int. Cl.
| | |
|---|---|
| *G06F 12/00* | (2006.01) |
| *G06F 3/06* | (2006.01) |
| *G06F 9/455* | (2018.01) |

(52) U.S. Cl.
CPC ............ *G06F 3/065* (2013.01); *G06F 3/067* (2013.01); *G06F 3/0619* (2013.01); *G06F 3/0664* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 2008/0271017 | A1* | 10/2008 | Herington | G06F 9/45558 718/1 |
| 2016/0371153 | A1* | 12/2016 | Dornemann | G06F 9/45558 |

\* cited by examiner

*Primary Examiner* — Jason W Blust
(74) *Attorney, Agent, or Firm* — Chamberlain, Hrdlicka, White, Williams & Aughtry

(57) ABSTRACT

A production host for hosting virtual machines includes a persistent storage and a production agent. The persistent storage stores a backup groupings queue and a backup process stack. The production agent obtains backup generation requests for the virtual machines; in response to obtaining the backup generation requests, generates the backup groupings queue based on the backup generation requests; identifies a maximum parallelism of the production host based on resources utilized by a portion of the virtual machines specified by the backup groupings queue; consolidates the backup groupings queue to generate the backup process stack; and generates backups for virtual machines specified by the backup process stack in parallel based on the maximum parallelism.

20 Claims, 10 Drawing Sheets

Example Backup Process Stack 300

Backup Process Stack Entry A 310A

Virtual Machine Identifiers 311

Virtual Machine Identifier A 312A

• • •

Virtual Machine Identifier N 312N

•
•
•

Backup Process N 310N

FIG. 3

Example Backup Requests 500

Backup Request A 512
- Virtual Machine Identifier A 502A
- Virtual Machine Identifier B 502B
- Virtual Machine Identifier C 502C

Backup Request B 514
- Virtual Machine Identifier A 502A
- Virtual Machine Identifier C 502C

Backup Request C 516
- Virtual Machine Identifier D 502D
- Virtual Machine Identifier E 502E

FIG. 5A

Example Backup Groupings Queue 520

Backup Grouping A 522
- Virtual Machine Identifier C 502C
- Virtual Machine Identifier A 502A
- Virtual Machine Identifier B 502B

Backup Grouping B 524
- Virtual Machine Identifier C 502C
- Virtual Machine Identifier A 502A

Backup Grouping C 526
- Virtual Machine Identifier E 502E
- Virtual Machine Identifier D 502D

FIG. 5B

Example Backup Process Stack 530

Backup Process Stack Entry A 532

| Virtual Machine Identifier C 502C | Virtual Machine Identifier A 502A | Virtual Machine Identifier B 502B |

Backup Process Stack Entry B 534

| Virtual Machine Identifier E 502E | Virtual Machine Identifier D 502D |

FIG. 5C

SYSTEM AND METHOD OF BACKUP GROUPING WITH IMPROVED COMPUTATIONAL EFFICIENCY

BACKGROUND

Computing devices may include any number of internal components such as processors, memory, and persistent storage. Each of the internal components of a computing device may be used to generate data. The process of generating, storing, and backing up data may utilize computing resources of the computing device such as processing and storage. The utilization of the aforementioned computing resources to generate backups may impact the overall performance of the computing devices.

SUMMARY

In one aspect, a production host for hosting virtual machines in accordance with one or more embodiments of the invention includes a persistent storage and a production agent. The persistent storage stores a backup groupings queue and a backup process stack. The production agent obtains backup generation requests for the virtual machines; in response to obtaining the backup generation requests, generates the backup groupings queue based on the backup generation requests; identifies a maximum parallelism of the production host based on resources utilized by a portion of the virtual machines specified by the backup groupings queue; consolidates the backup groupings queue to generate the backup process stack; and generates backups for virtual machines specified by the backup process stack in parallel based on the maximum parallelism.

In one aspect, a method for hosting virtual machines in accordance with one or more embodiments of the invention includes obtaining backup generation requests for the virtual machines; in response to obtaining the backup generation requests, generating the backup groupings queue based on the backup generation requests; identifying a maximum parallelism of the production host based on resources utilized by a portion of the virtual machines specified by the backup groupings queue; consolidating the backup groupings queue to generate a backup process stack; and generating backups for virtual machines specified by the backup process stack in parallel based on the maximum parallelism.

In one aspect, a non-transitory computer readable medium in accordance with one or more embodiments of the invention includes computer readable program code, which when executed by a computer processor enables the computer processor to perform a method for hosting virtual machines. The method includes obtaining backup generation requests for the virtual machines; in response to obtaining the backup generation requests, generating the backup groupings queue based on the backup generation requests; identifying a maximum parallelism of the production host based on resources utilized by a portion of the virtual machines specified by the backup groupings queue; consolidating the backup groupings queue to generate a backup process stack; and generating backups for virtual machines specified by the backup process stack in parallel based on the maximum parallelism.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3 shows a diagram of an example backup process stack in accordance with one or more embodiments of the invention.

FIG. 5A shows a diagram of example backup requests.

FIG. 5B shows a diagram of an example backup groupings queue.

FIG. 5C shows a diagram of an example backup process stack.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for concurrently generating backups of virtual machines or other entities. Embodiments of the invention may concurrently generate backups by generating groupings of the virtual machines and ordering each grouping so that backup generation for the virtual machines is performed in a partially concurrent, predetermined order. Generation of backups for each of the groupings may be performed concurrently or in a partially overlapping manner. Doing so may improve computing device technology in a distributed network by increasing the data transfer rate of backups to a backup storage while maintaining the uptime of virtual machines hosted by computing devices.

Figure 1:
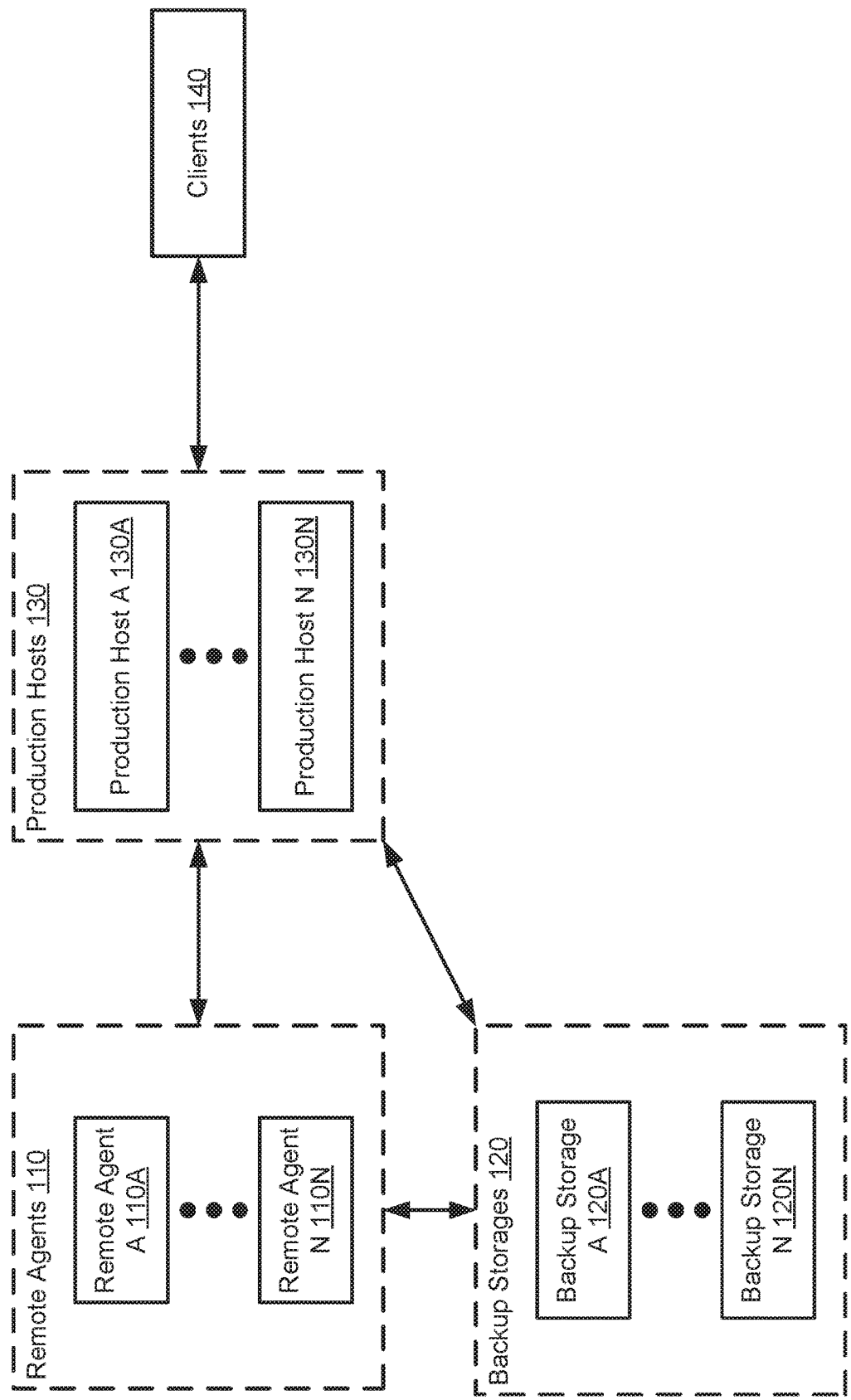
FIG. 1 shows a diagram of a system in accordance with one or more embodiments of the invention.

FIG. 1 shows an example system in accordance with one or more embodiments of the invention. The system may include remote agents (110) that provide backup services to production hosts (130). Backup services may include the generation and storage of backups in backup storages (120) and restoration of the production hosts using previously generated backups that are stored in the backup storages (120).

The production hosts (130) may provide services to the clients (140). For example, the production hosts (130) may host applications that provide application services to the clients (140). By providing application services to the clients (140), data that is relevant to the clients (140) may be stored in the production hosts (130).

Each component of the system of FIG. 1 may be operably connected to each other component and/or additional components (not shown) via any combination of wired and/or wireless connections. Each component of the system is discussed below.

In one or more embodiments of the invention, the remote agents (110) provide backup services to the production hosts (130). The remote agents (110) may provide backup services to the production hosts (130) by orchestrating: (i) generation of backups of the production hosts, (ii) storage of backups of the production hosts (130) in backup storages (120), (iii) consolidation of backup requests to reduce and/or prevent generation and/or storage of backups that are not useful for restoration purposes, and (iv) restoration of the production hosts (130) to previous states using backups stored in the backup storages (120). The system may include any number of remote agents (e.g., 110A, 110N) without departing from the invention.

To provide the aforementioned backup services, the remote agents (110) may include functionality to generate and issue instructions to any component of the system of FIG. 1. The remote agents (110) may generate such instructions in accordance with backup schedules that specify when backups are to be generated and/or in response to requests for backup generation from other entities.

In one or more embodiments of the invention, the remote agents (110) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage e.g., disk drives, solid state drives, etc.). The computing device may include instructions, stored on the persistent storage, that when executed by the processor(s) of the computing device cause the computing device to perform the functionality of the remote agents (110) described throughout this application and/or all, or a portion, of the methods illustrated in FIG. 4A-4C. For additional details regarding computing devices, refer to FIG. 6.

In one or more embodiments of the invention, the remote agents (110) are implemented as logical devices. The logical devices may utilize the computing resources of any number of computing devices and thereby provide the functionality of the remote agents (110) described throughout this application and/or all, or a portion, of the methods illustrated in FIGS. 4A-4C.

In one or more embodiments of the invention, the backup storages (120) provide data storage services. For example, the backup storages (120) may store backups of the production hosts (130). Similarly, the backup storages (120) they provide copies of previously stored backups of the production hosts (130). The system may include any number of backup storages (e.g., 120A, 120N) without departing from the invention.

In one or more embodiments of the invention, the backup storages (120) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage (e.g., disk drives, solid state (hives, etc.). The computing device may include instructions, stored on the persistent storage, that when executed by the processor(s) of the computing device cause the computing device to perform the functionality of the backup storages (120) described throughout this application. For additional details regarding computing devices, refer to FIG. 6.

In one or more embodiments of the invention, the backup storages (120A, 120N) are implemented as logical devices. A logical device may utilize the computing resources of any number of computing devices and thereby provide the functionality of the backup storages (120) described throughout this application.

in one or more embodiments of the invention, the production hosts (130) provide services to the clients (140). For example, the production hosts (130) may host any number of applications that provide application services to the clients (140). The system may include any number of production hosts (e.g., 130A, 130N) without departing from the invention.

In one or more embodiments of the invention, application services may be any type of computer implemented service. For example, application services may be database services, electronic communication services, instant messaging services, file storage services, and/or any other type of service.

Each of the production hosts (e.g., 130A, 130N) may provide application services by hosting applications. Each of the production hosts may host any number of applications. Different production hosts may host the same number of applications or different numbers of applications. Different production hosts may host similar applications or different applications.

In one or more embodiments of the invention, the production hosts (130) host virtual machines that host applications. Each of the production hosts may host any number of virtual machines that, in turn, host any number of applications.

In one or more embodiments of the invention, the production hosts (130) perform portions of a backup generation process. For example, the production hosts (130) may generate backups under the direction of the remote agents (110). In one or more embodiments of the invention, the production hosts (130) include functionality to consolidate multiple backup generation requests so that duplicative backups are not generated. Generating a duplicative backup may not be useful for restoration purposes.

In one or more embodiments of the invention, the production hosts (130) include functionality to generate multiple backups in parallel or in a partially overlapping manner. For example, the production hosts (130) may each host multiple backup generation processes that each manages the generation of a respective backup. Each of the multiple generation processes may operate concurrently thereby causing multiple backups to be generated in parallel and/or in a partially overlapping in time manner.

In one or more embodiments of the invention, the production hosts (130) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the production hosts (130) described throughout this application and/or all, or a portion, of the methods illustrated in FIGS. 4A-4C. For additional details regarding computing devices, refer to FIG. 6.

In one or more embodiments of the invention, the production hosts (130) are implemented as logical devices. A logical device may utilize the computing resources of any number of computing devices to provide the functionality of the production host (130) described throughout this application and/or all, or a portion, of the methods illustrated in FIGS. 4A-4C. For additional details regarding the production hosts (130), refer to FIG. 2.

In one or more embodiments of the invention, the clients (140) interact with the production hosts (130). For example, the clients (140) may utilize application services provided by the production hosts (130). When the clients (140) interact with the production hosts (130) data that is relevant to the clients (140) may be stored on the production hosts (130).

For example, consider a scenario in which the production hosts (130) host a database utilized by the clients (140). In this scenario, the database may be a customer database of customers of the clients (140). When a new customer is identified, one of the clients may add information regarding the new customer to the database. By doing so, data that is relevant to the clients (140) may be stored in the production hosts (130) because the clients (140) a desire access to the data regarding the new customer at some future point in time.

In one or more embodiments of the invention, the clients (140) include functionality to use services provided by the production hosts (130). For example, the clients (140) may host local applications that interact with applications hosted by the production hosts (130).

In one or more embodiments of the invention, the clients (140) are implemented as computing devices. A computing device may be, for example, a mobile phone, a tablet computer, a laptop computer, a desktop computer, a server, a distributed computing system, or a cloud resource. The computing device may be other types of devices without departing from the invention. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (140) described throughout this application and/or all, or a portion, of the methods illustrated in FIGS. 4A--4C. For additional details regarding computing devices, refer to FIG. 6.

In one or more embodiments of the invention, the clients (140) are implemented as logical devices. A logical device may utilize the computing resources of any number of computing devices to provide the functionality of the clients (140) described throughout this application.

While the system of FIG. 1 has been illustrated as including a limited number of components for the sake of brevity, the system may include additional components (not shown), fewer components, and/or different components (not shown) without departing from the invention.

Figure 2:
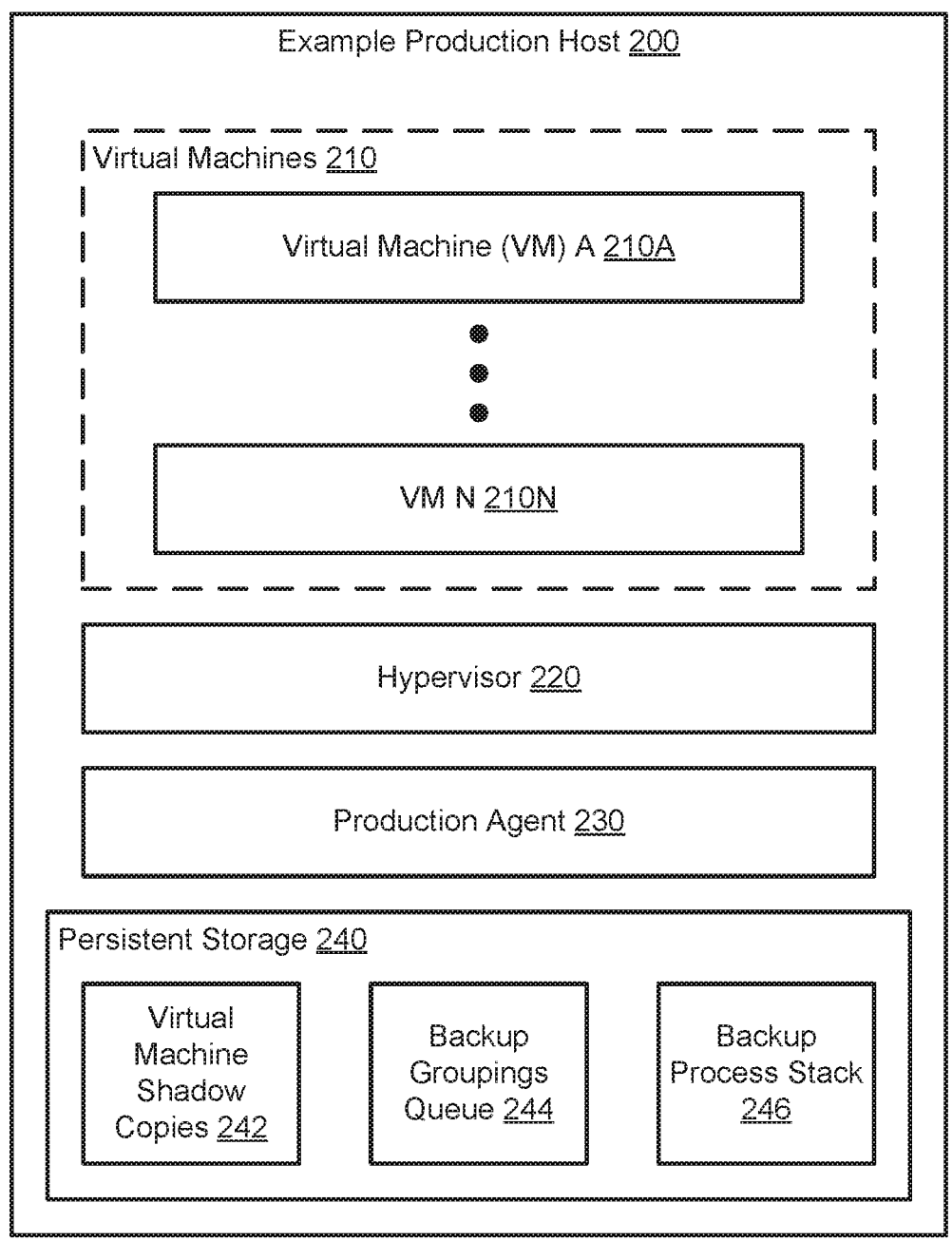
FIG. 2 shows a diagram of an example production host in accordance with one or more embodiments of the invention.

As discussed above, production hosts may generate backups of data that is relevant to clients or other entities. FIG. 2 shows a diagram of an example production host (200) in accordance with one or more embodiments of the invention. The example production host (200) may be similar to the production host (130) discussed above.

To provide the functionality of the production hosts discussed above, the example production host (200) may include virtual machines (210), a hypervisor (220), a production agent (230), and a persistent storage (240). Each of these components the example production host (200) is discussed below.

In one or more embodiments of the invention, the virtual machines (210) are logical entities executed using computing resources of the example production host (200) and/or other computing devices. Each of the virtual machines (e.g., 210A, 210N) may be performing similar or different processes.

By execution of the virtual machines (210), virtual machine data (not shown) may be stored in the persistent storage (240). In other words, virtual machines (210) and applications hosted by the virtual machines may generate data that is stored in the persistent storage (240). The virtual machine data may reflect the state of a virtual machine.

In one or more embodiments of the invention, the virtual machines (210) provide services to clients (e.g. 140, FIG. 1). For example, the virtual machines (210) may host instances of databases, email servers, and/or other applications. The virtual machines (210) may host other types of applications without departing from the invention. The applications hosted by the virtual machines (210) may provide application services to clients.

Figure 4A:
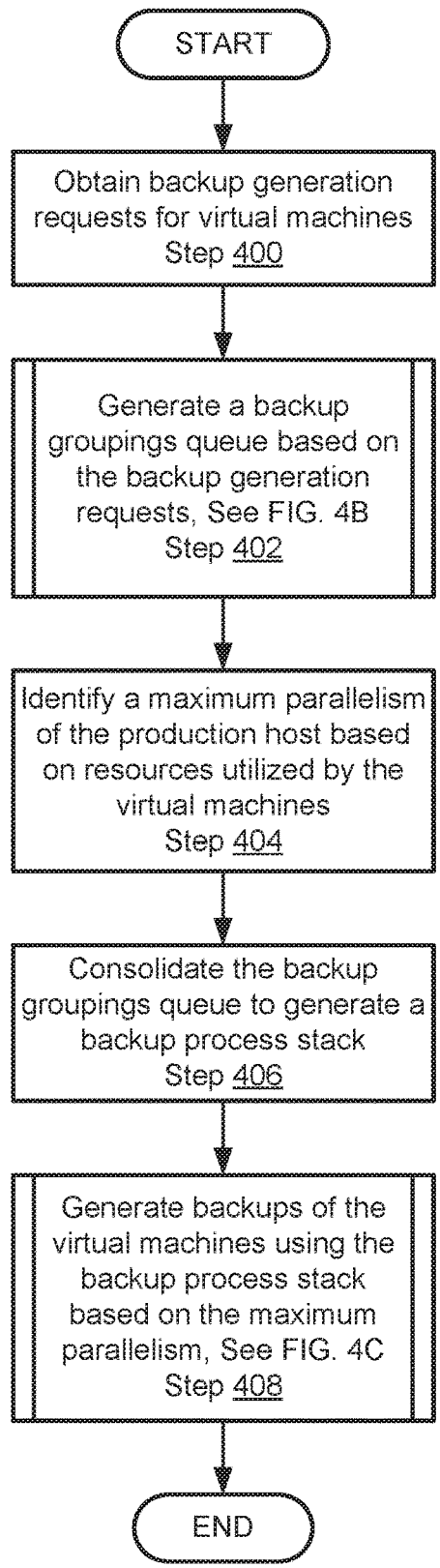
FIG. 4A shows a flowchart of a method of performing concurrent backups of virtual machines in accordance with one or more embodiments of the invention.
Figure 4B:
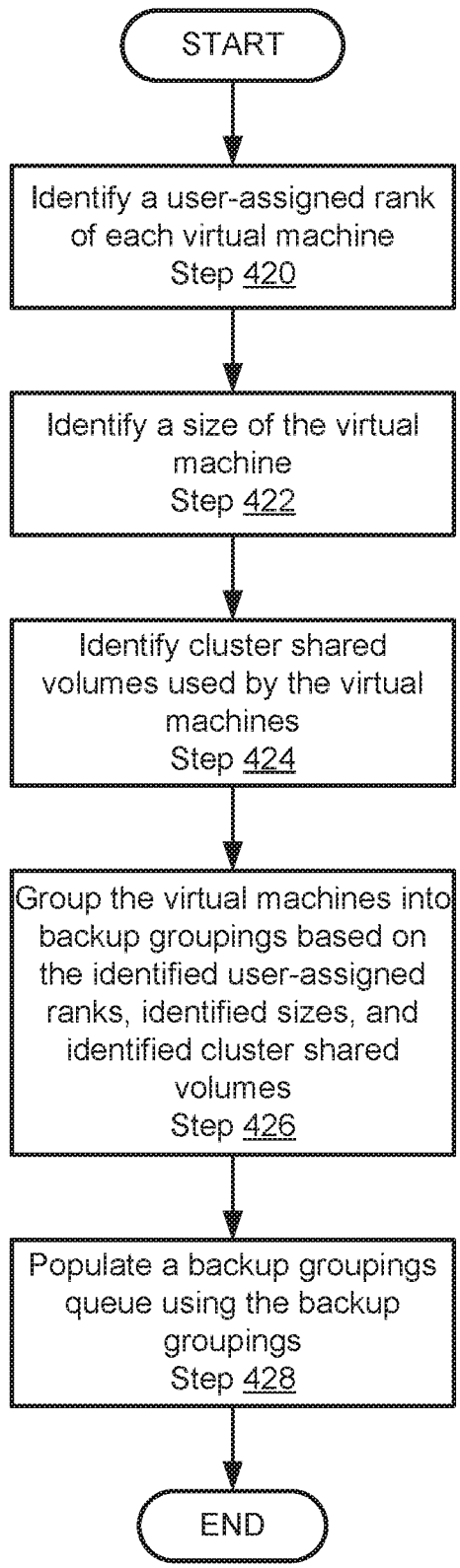
FIG. 4B shows a flowchart of a method of generating a backup groupings queue in accordance with one or more embodiments of the invention.
Figure 4C:
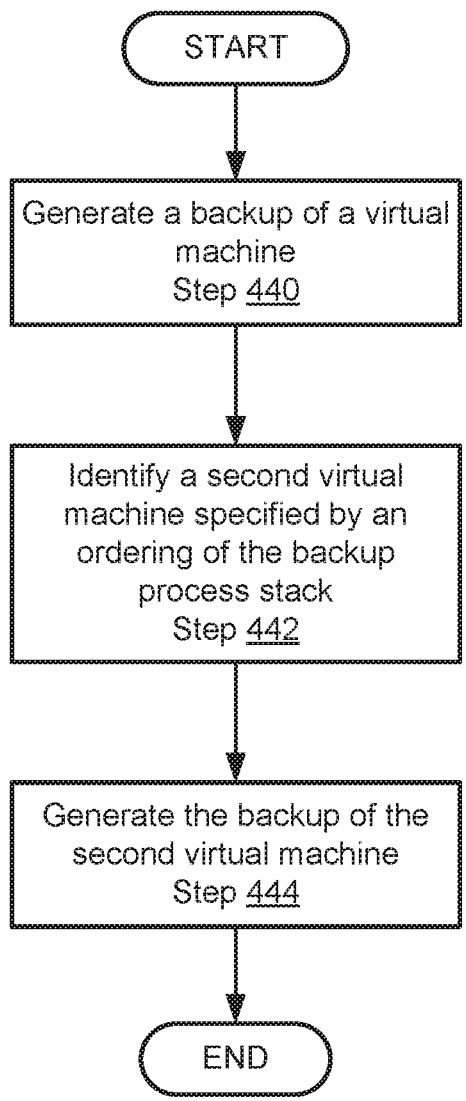
FIG. 4C shows a flowchart of a method of generating backups of the virtual machines in accordance with one or more embodiments of the invention.

In one or more of embodiments of the invention, the virtual machines (210) are implemented as computer instructions, e.g., computer code, stored on a persistent storage that when executed by a processor of the example production host (200) cause the example production host 200) to provide the functionality of the virtual machines (210) described throughout the application and/or all, or a portion, of the methods illustrated in FIGS. 4A-4C.

In one or more embodiments of the invention, the hypervisor (220) orchestrates the operation of the virtual machines (210). The hypervisor (220) may orchestrate the operation of the virtual machines (210) by allocating computing resources to each of the virtual machines (210).

In one or more embodiments of the invention, the hypervisor (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (220) described throughout this application and/or all or a portion of the methods illustrated in FIGS. 4A-4C.

In one or more of embodiments of the invention, the hypervisor (220) is implemented as computer instructions, e.g., computer code, stored on a persistent storage that when executed by a processor of the example production host (200) cause the example production host (200) to provide the functionality of the hypervisor (220) described throughout the application and/or all or a portion of the methods illustrated in FIGS. 4A-4C.

In one or more embodiments of the invention, the production agent (230) locally orchestrates the performance of backup services for the virtual machines (210). The production agent (230) may orchestrate the performance of backup services under the direction of remote agents. For example, the remote agents may send instructions to the production agent (230) regarding when backups of the virtual machines (210) should be generated, where the generated backups should be stored, and when a virtual machine should be restored to a previous state.

To orchestrate the performance of backup services, the production agent (230) may issue commands to the hypervisor (220) to control the operation of the virtual machine (210) when a backup of one of the virtual machines (210) is being generated and/or when a restoration of one of the virtual machines (210) is to be performed.

To locally orchestrate the generation of backups of the virtual machines (210), may generate virtual machine shadow copies (242) of virtual machine data, stored in the persistent storage (240). A virtual machine shadow copy may reflect virtual machine data of a virtual machine at a particular point in time. A backup for a virtual machine may be generated using a respective virtual machine shadow copy by either (i) including data that is representative of the state of the virtual machine at the point in time the virtual machine shadow copy is generated or (ii) including data that representative of the difference between the state of the virtual machine at the point in time the virtual machine shadow copy is generated and a second state of the virtual machine at a second point in time prior to the point in time. In other words, data that reflects a state or data that reflects changes to a state.

Generation of backups may be a computing resource intensive task. Embodiments of the invention may provide a mechanism for reducing the computing resource cost of generating backups. A production agent (230) in accordance with embodiments of the invention may reduce the computing resource cost of generating backups by: (i) identifying multiple instructions for generating backups that (ii) would result in duplicative backups and (iii) only generating backups of the multiple instructions for generating backups that do not result in duplicative backups. By doing so, the computing resource cost of generating backups may be reduced when compared to contemporary methods that may result in the generation of duplicative backups.

In one or more embodiments of the invention, the production agent (230) is a hardened entity, i.e., not modifiable by an entity that is remote to the example production host (200) on which the production agent (230) is executing. The production agent (230) may have a set, finite number of predefined functions that may be invoked by a remote entity. In one or more embodiments of the invention, the production agent (230) is not configurable by modifying settings or associated configuration files by a remote entity.

In one or more embodiments of the invention, the production agent (230) is implemented as computer instructions, e.g., computer code, stored on a persistent storage that when executed by a processor of the example production host (200) cause the example production host (200) to provide the functionality of the production agent (230) described throughout the application and/or all, or a portion, of the methods illustrated in FIGS. 4A-4C.

In one or more embodiments of the invention, the production agent (230) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (230) described throughout this application and/or all or a portion of the methods illustrated in FIGS. 4A-4C.

In one or more embodiments of the invention, the persistent storage (240) is a physical computer readable storage medium. For example, the persistent storage (240) may be/include hard disk drives, solid state drives, tape drives, and/or other physical storage media. The persistent storage (240) may be other types of digital storage without departing from the invention. The persistent storage (240) may be a virtualized storage without departing from the invention.

In one or more embodiments of the invention, the persistent storage (240) stores data such as, for example, the virtual machine shadow copies (242), a backup groupings queue (244), and a backup process stack (246). Each of these data structures is discussed below.

The virtual machine shadow copies (242) may be data structures that include copies of virtual machine data. The virtual machine shadow copies (242) may be generated by the production agent (230) in response to backup generation requests for the virtual machines (210). Backups for storage in backup storage may be generated using the virtual machine shadow copies (242).

The backup groupings queue (244) may be a data structure that includes groupings of virtual machines (210) identified by backup generation requests. The virtual machines (210) may be grouped based on priority characteristics of the virtual machines. The production agent (230) may order the virtual machines in backup generation requests and place them in groupings of the backup groupings queue (244) using the priority characteristics of each virtual machine. The priority characteristics may include, for example, a size of the virtual machine and a user-assigned rank of the virtual machine. Other priority characteristics may be used to group the virtual machines without departing from the invention.

The backup process stack (246) may be a data structure that includes information for generating backups in parallel and/or a partially overlapping in time manner. The information may include consolidated groupings of the backup groupings queue (244). The backup process stack (246) may include each virtual machine identified in the backup generation requests once. In contrast, the backup groupings queue (244) may include the virtual machines identified in the backup generation requests any number of times as specified by the backup generation requests.

For example, two backup generation requests may each identify the same virtual machine (e.g., 210A). The backup groupings queue (244) may include two groupings with that each identifies the same virtual machine (e.g., 210A) as the respective request, regardless of any repeating virtual machines. In contrast, the backup process stack (246) may include a backup process stack entry that is a consolidation of the two backup groupings. The backup process stack entry may identify each virtual machine once. For additional details regarding the backup process stack (246), refer to FIG. 3.

While illustrated, for the sake of brevity, as including a limited number of components, the example production host (200) may include addition, fewer, and additional components from those illustrated in FIG. 2 without departing from the invention.

FIG. 3 shows a diagram of an example backup process stack (300) in accordance with one or more embodiments of the invention. The example backup process stack (300) may be similar to the backup process stack (246, FIG. 2) discussed above.

In one or more embodiments of the invention, the example backup process stack (300) is a data structure that includes information used for generating backups of virtual machines in parallel or a partially overlapping in time manner. The example backup process stack (300) may include any number of backup process stack entries (e.g., 310A, 310N). Each backup process stack entry (e.g., 310A, 310N) may include any number of virtual machine identifiers (311). Each portion of the example backup process stack (300) is discussed below.

In one or more embodiments of the invention, each of the virtual machine identifiers (e.g., 312A, 312N) correspond to respective virtual machines to be backed up. A production agent may generate a backup of each of the virtual machine identifiers (312A, 312N) specified in the example backup process stack (300). Each virtual machine identifier (312A, 312N) may identify a unique virtual machine. In other words, a virtual machine specified by a virtual machine identifier (312A, 312N) in the example backup process stack (300) may not be specified by any other virtual machine identifier (312A, 312N) in the example backup process stack (300).

In one or more embodiments of the invention, each backup process stack entry (310A, 310N) specifies an order in which backups of virtual machines are generated. The virtual machine identifiers (311) in each backup process stack entry (310A, 310N) may be organized in a predetermined order. The production host may perform a backup of a virtual machine by identifying a virtual machine specified by a first virtual machine identifier (e.g., 312A) of a backup process stack entry (310A, 310N), generating a backup of the virtual machine, identifying a virtual machine of a second virtual machine specified by a second virtual machine identifier, generate a backup of the second machine, and repeat the process until all virtual machines specified by the virtual machine identifiers (312A, 312N) of the backup process stack entry (310A, 310N) are backed up.

in one or more embodiments of the invention, each backup process stack entry (310A, 310N) is backed up concurrently. In other words, the production agent may generate more than one backup of virtual machines by performing the backups specified by each backup process stack entry (310A, 310N) at the same time. For example, multiple instances, each performing the method discussed above, may be generating backups for each of the backup process stack entries. By doing so, backups may be generated in parallel and/or in a partially overlapping in time manner. In one or more embodiments of the invention, the number of instances is the same as the number of backup process stack entries.

While the various steps in the following flowcharts are presented and described sequentially, one of ordinary skill in the relevant art will appreciate that some or all of the steps in any of FIGS. 4A-4C may be executed in a different order, may be combined or omitted, and some or all steps in any of FIGS. 4A-4C may be executed in parallel.

As discussed above, a production host may concurrently generate backups for multiple virtual machines. FIG. 4A. shows a flowchart of a method in accordance with one or more embodiments of the invention. The method depicted in FIG. 4A may be used to generate backups of virtual machines in accordance with one or more embodiments of the invention. The method shown in FIG. 4A may be performed by, for example, production hosts (130, FIG. 1). Other components of the system illustrated in FIG. 1 may perform the method of FIG. 4A without departing from the invention.

In Step 400, backup generation requests for virtual machines are obtained.

In one or more embodiments of the invention, one or more of the backup generation requests are obtained from a clients. The clients may be operated by users. The users may request that backups of virtual machines be generated by sending requests for such generations via the clients to the production host. The backup generation requests may include any number of backup requests from any number of clients operated by any number of users.

In one or more embodiments of the invention, one or more of the backup generation requests are obtained from remote agents. The remote agents may send such requests in accordance with backup policies that specify when backups are to be generated. The backup generation requests may include any number of backup requests from any number of remote agents.

In one or more embodiments of the invention, each backup generation request specifies the identities of virtual machines for which backups are to be generated. For example, the backup generation requests may include virtual machine identifiers of each virtual machine for which a backup is to be generated.

In one or more embodiments of the invention, the backup generation requests are obtained over a predetermined period of time. For example, the backup generation requests may be obtained over a period of ten minutes. During the predetermined period of time, backup generation requests may be obtained and aggregated for future use. The predetermined period of time may be of any duration without departing from the invention. Backup generations may be performed after the predetermined period of time.

In one or more embodiments of the invention, the backup generation requests are obtained over a variable period of time. The variable period of time may have a duration based on, for example, the number of backup generation requests meeting a predetermined threshold. The variable period of time may be based on other factors without departing from the invention. For example, the variable period of time may have a predetermined duration unless a number of backup generation requests meeting a threshold are received before the end of the predetermined period of time. In such a scenario, the variable period of time may be the period of time during which the number of backup generation meeting the threshold are obtained.

In Step 402, a backup groupings queue is generated based on the backup generation requests.

In one or more embodiments of the invention, the backup groupings queue s generated by identifying the backup requests, identifying priority characteristics of the virtual machines specified in the backup requests, and generating an ordering of the virtual machines based on the priority characteristics. The generated ordering may be used to populate the backup groupings queue.

In one or more embodiments of the invention, the backup groupings queue is generated using the method illustrated in FIG. 4B. The backup groupings queue may be generated via other methods without departing from the invention.

In Step 404, a maximum parallelism of the production host is identified based on resources utilized by the virtual machines.

In one or more embodiments of the invention, the maximum parallelism of the production host is identified based on the computing resources of the production host. Each virtual machine may be allocated a portion of the computing resources that the virtual machine may use. The maximum parallelism may be estimated by identifying the computing resources being used by the virtual machines and comparing the used computing resources to the total computing resources of the production host to generate an estimate of the available computing resources of the production host.

For each virtual machine of the virtual machines requested, a backup generation estimate may be generated to estimate an amount of computing resources required to generate a backup of the virtual machine. The available computing resources and the backup generation estimates of the virtual machines, for which backups are to be generated, may be used to estimate a maximum number of backups to be generated at a time (i.e. the maximum parallelism). For example, the estimate of the available computing resources of the production host may be divided by the average of the backup generation estimates. Other methods for determining the maximum number of backups to be generated concurrently may be used without departing from the invention.

In Step 406, the backup groupings queue is consolidated to generate a backup process stack.

In one or more embodiments of the invention, the backup groupings queue is consolidated by identifying each grouping that specifies a virtual machine specified by another grouping. In other words, duplicate backup requests are identified. The duplicates may be merged to obtain a backup process stack entry. This process may be repeated to obtain all of the backup process stack entries of the backup process stack.

In one or more embodiments of the invention, the backup groupings queue is consolidated by removing duplicate virtual machine identifiers from the backup groupings queue. The production host performing the backups may identify two or more copies of virtual machine identifiers that specify the same virtual machine and remove the virtual machine identifiers specifying the same virtual machine except for one of the virtual machine identifiers.

In one or more embodiments of the invention, the backup process stack is populated with the consolidated backup. Each consolidated backup grouping may be a backup process stack entry.

In Step 408, backups of the virtual machines are generated using the backup process stack based on the maximum parallelism.

In one or more embodiments of the invention, a number of processes for generating backups may be instantiated. The number may be equal to the maximum parallelism. Each of the number of processes may be assigned to generate backups of virtual machines specified by entries of the backup process stack. For example, each process may be assigned to generate backups of virtual machines specified by a particular entry of the backup process stack. Each process may be assigned to different entries. Each of the processes may operative in a parallel or at least partially overlapping in time manner.

In one or more embodiments of the invention, the backups are generated by generating a first backup of each virtual machine specified by a number of backup process stack entries that matches the maximum parallelism, and repeating the backup generation for each virtual machine of each backup process stack entry of the backup process stack. In other words, a number of backup process entries matching the number of maximum parallelism may be processed at one time. Each backup process stack entry may be processed by generating the backups of virtual machines in the order specified by the backup process stack entry. When a backup process stack entry is completed, an unprocessed backup process stack entry may be processed until all of the backup process stack entries have been processed.

In one or more embodiments of the invention, the backups are generated using the method illustrated in FIG. 4C. The backups may be generated via other methods without departing from the invention.

The method may end following Step 408.

FIG. 4B shows a flowchart of a method in accordance with one or more embodiments of the invention. The method depicted in FIG. 4B may be used to generate a backup groupings queue in accordance with one or more embodiments of the invention. The method shown in FIG. 4B may be performed by, for example, production hosts (130, FIG. 1). Other components of the system illustrated in FIG. 1 may perform the method of FIG. 4B without departing from the invention.

In Step 420, a user-assigned rank of each virtual machine is identified.

In one or more embodiments of the invention, a user-assigned rank is a priority characteristic assigned by a user to a virtual machine prior to sending a backup generation request. The user-assigned rank of a virtual machine may be relative to the other virtual machines in the backup generation request. The user-assigned ranking of a virtual machine may be a highest ranking, lowest ranking, and/or any intermediate ranking between the highest or lowest ranking. The user-assigned rank may be identified for each virtual machine of each backup generation request obtained by the production host.

In one or more embodiments of the invention, the user does not assign a user-assigned rank to every virtual machine of the backup generation request. In other words, not every virtual machine may have a user-assigned rank.

In Step 422, a size of each virtual machine is identified.

In one or more embodiments of the invention, the size of a virtual machine is a priority characteristic that specifies an amount of data that a backup of the virtual machine may include after being generated. For example, a user may request that a partial backup of 50% of a virtual machine that be backed up. The virtual machine may include 10 GB of data. The production host may identify a size of the virtual machine as 5 GB because that is how much of the virtual machine that may be backed up. The size of a virtual machine may be identified by each virtual machine specified by each backup generation request.

In Step 424, cluster shared volumes used by the virtual machine, that are to be backed up, are identified.

In one or more embodiments of the invention, a cluster shared volume is a priority characteristic that specifies a portion of computing resources that are shared by a group of virtual machines. The portion of computing resources may be used by the virtual machines to process and/or store data. Each virtual machine may be associated with a cluster shared volume based on a portion of computing resources used by the virtual machine.

For example, a cluster shared volume may be disk that multiple virtual machines may have access to for data storage/data read purposes. If backups of multiple virtual machines utilizing a cluster shared volume are performed concurrently, the cluster shared volume may limit the rate at which the backups may be generated. In other words, it may not be possible to effectively parallelize generation of backups of virtual machines that utilize a shared resource. Embodiments of the invention may reduce the likelihood of shared resources preventing backup generation parallelization by identifying such virtual machines prior to generating backups.

In one or more embodiments of the invention, the cluster shared volumes are identified by the portion of the computing resources used by the virtual machines specified in the backup requests.

In Step 426, the virtual machines are grouped into backup groupings based on the identified user-assigned ranks, identified sizes, and identified cluster shared volumes.

In one or more embodiments of the invention, the virtual machines are grouped by reordering the virtual machines in each backup generation request based on the identified priority characteristics discussed above. A backup grouping may be reordered by assigning a virtual machine identifier with the highest user-assigned rank as the first virtual machine in the backup grouping. The lowest user-assigned rank of a virtual machine identifier may be used to place the virtual machine in last place. Any virtual machines with intermediate user-assigned ranks may be ordered based on the size of the virtual machine. For example, a virtual machine of the intermediate user-assigned rank with a smaller size may be placed higher in the order than a virtual machine of the intermediate user-assigned rank with a larger size. Any virtual machines without an identified user-assigned rank may be ordered by size similar to the virtual machines of the intermediate user-assigned rank.

In one or more embodiments of the invention, the cluster shared volumes are used for further reordering so that backups of virtual machines in the same cluster shared volume are not generated at the same time. For example, a grouping may specify a first virtual machine being first in the grouping. Another grouping may specify a second virtual machine that is in the same cluster shared volume as the first virtual machine. The second virtual machine may be first in its respective grouping. To avoid having the backups of the two virtual machines being generated at the same time, the production host may place the second virtual machine in a different place in its respective grouping (i.e. in second place). While described with respect to a shared cluster volume, embodiments of the invention may reorder the backups for virtual machines based on any type of shared research other than shared cluster volumes without departing from the invention.

In 428, a backup groupings queue is populated using the backup groupings. The backup groupings queue may be populated by adding the backup groupings obtained in Step 426 to the backup groupings queue.

The method may end following Step 428.

FIG. 4C shows a flowchart of a method in accordance with one or more embodiments of the invention. The method depicted in FIG. 4C may be used to generate backups in accordance with one or more embodiments of the invention. The method shown in FIG. 4C may be performed by, for example, production hosts (130, FIG. 1). Other components of the system illustrated in FIG. 1 may perform the method of FIG. 4C without departing from the invention.

The method shown in FIG. 4C may be performed in parallel and/or a partially overlapping in time manner for each backup process stack entry processed by the production host.

In Step 440, a backup of a virtual machine is generated.

In one or more embodiments of the invention, the backup is generated by quiescing the virtual machine, generating a virtual machine shadow copy of the virtual machine, generate a backup based on the virtual machine shadow copy, and sending the backup to a backup storage. The virtual machine may be specified by a backup process stack entry as the highest placed virtual machine in the backup process stack entry.

In Step 442, a second virtual machine specified by an ordering of the backup process stack is identified.

In one or more embodiments of the invention, the second virtual machine is the next highest-placed virtual machine in the backup process stack entry, The production host may identify the second virtual machine by identifying the order or the backup process stack entry and identifying the virtual machine that follows the virtual machine of Step 440 in the identified order.

In Step 444, a backup of the second virtual machine is generated after the backup of the virtual machine is generated.

In one or more embodiments of the invention, the backup of the second virtual machine is generated by quiescing the virtual machine, generating a virtual machine shadow copy of the second virtual machine, merging the virtual machine shadow copy to generate a single data structure, and sending the single data structure to a backup storage.

The method may end following Step 444.

To further clarify aspect of embodiments of the invention, a non-limiting example is provided in FIGS. 5A-5C. FIGS. 5A-5C may illustrate portions of a system similar to that of FIG. 1.

EXAMPLE

Consider a scenario in which backup generation requests for virtual machines are obtained by a production host within a predetermined time period. FIG. 5A shows a diagram of example backup generation requests (500) obtained by the production host (not shown). Each request (e.g., 512, 514, 516) may include a number of virtual machine identifiers (502A, 502B, 502C, 502D, 502E) that identify virtual machines for which backups have been requested.

A first user that sent backup request A (522) may not have assigned virtual machine identifier A (502A) a user-assigned rank. In contrast, the first user may have assigned a lowest rank to virtual machine identifier B (502B) and a highest rank for virtual machine identifier C (502C).

A second user that sent backup request B (514) may not have assigned a rank to virtual machine identifiers A (502A) or C (502C). The production host may identify a size of 10 GB for virtual machine identifier A (502A) and 5 GB for virtual machine identifier C (502C).

A third user that sent backup request C (516) may not have assigned a rank to virtual machine identifiers D (502D) or E (502E). The production host may identify a size of 10 GB for both virtual machine identifier D (502D) and virtual machine identifier C (502E). Additionally, the production host may identify that virtual machine identifiers C (502C) and (502D) belong to the same cluster shared volume.

The production host may perform the method of FIGS. 4A-4B to generate a backup groupings queue that reorders each backup groupings queue based on the priority characteristics of each virtual machine identifier (502A, 502B, 502C, 502D, 502E).

FIG. 5B shows an example backup groupings queue (520) generated by the production host. The example backup groupings queue may include backup groupings (e.g., 522, 524, 526) that specify the virtual machine identifiers (502A, 502B, 502C, 502D, 502E). Each of the backup groupings (e.g., 522, 524, 526) may specify the same virtual machine identifiers (502A, 502B, 502C, 502D, 502E) of a respective backup generation request (e.g., 512, 514, 516, FIG. 5A), but may have reordered the virtual machine identifiers (502A, 502B, 502C, 502D, 502E) based on the priority characteristics.

Backup grouping A (522) may order the virtual machine identifiers (502C, 502A, 502B) from highest user-assigned rank to lowest user-assigned rank. Backup grouping B (524) may order the virtual machine identifiers (502C, 502A) by size from smaller size to larger size. Backup grouping C (526) may order the virtual machines (502E, 502D) based on the cluster shared volume of virtual machine identifier D (502D). Because virtual machine identifier D (502D) is in the same cluster shared volume as virtual machine identifier C (502C), the two virtual machine identifiers may not be in the same order in their respective backup groupings (e.g., 522, 524, 526). Therefore, virtual machine identifier D (502D) may be moved to the second place following virtual machine identifier E (502E).

The production host may perform the method of FIG. 4A to consolidate the example backup groupings queue (520) to generate a backup process stack. FIG. 5C shows an example backup process stack (530) generated by consolidating the example backup groupings queue (520). The example backup groupings queue (520) may be consolidated by merging groupings that include virtual machines identifiers (502A, 502B, 502C, 502D, 502E) identical to virtual machine identifiers or other groupings in the example backup groupings queue (520). Because the virtual machine identifiers (502A, 502C) of backup groupings B (524) are identical to virtual machine identifiers (502A, 502C) of backup grouping A (522), the production host may group the backup groupings (e.g., 522, 524) to generate a backup process stack entry (532) with each virtual machine identifier (502C, 502A, 502B) specified only once. Additionally, backup grouping C (526) may populate the example backup process stack (530) as backup process stack entry B (534).

The example backup process stack (530) may be used to generate the virtual machines concurrently. In other words, each backup process stack entry (e.g., 532, 534) may be performed in parallel or a partially overlapping in time manner to generate backups in the order specified by each backup process stack entry (e.g., 532, 534).

End of Example

Figure 6:
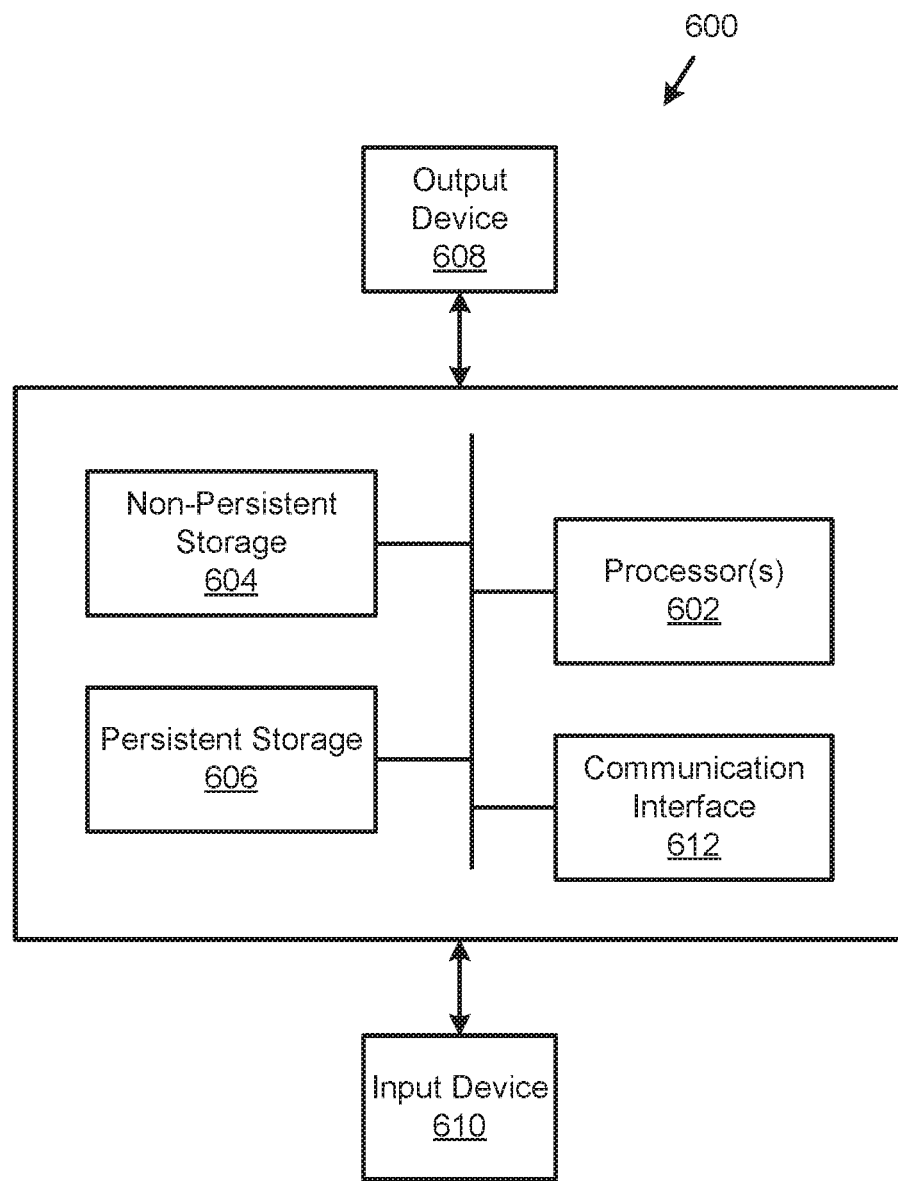
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may provide an improved method for generating backups of resources in a distributed environment. Specifically, embodiments of the invention may provide a method for generating backups that: (i) consumes fewer computing resources when compared to contemporary methods, (ii) reduces the likelihood of generating backups that are not useful for restoration purposes, and (iii) generates backups more quickly than contemporary methods. For example, by consolidating multiple backup generation requests, the computing resource cost of backup generation may be reduces by reducing the likelihood of generating duplicative backups. Additionally, by providing a method of generating multiple backups concurrently, embodiments of the invention may reduce the time required for backup generation in a distributed environment.

Thus, embodiments of the invention may address the problem of backup generation in a distributed system where any number of entities, operating independently may request backup generation of other entities. Embodiments of the invention may address this problem by performing a consolidation and reorganization of the requests in a manner that eliminates duplicative backups and reduces the likelihood of attempting to generating backups in parallel for virtual machines, or other entities, that cannot be parallelized for backup generation purposes because of shared use of resources of the distributed system. This problem arises due to the technological nature of the environment, i.e., a distributed environment, in which backups are generated.

The problems discussed above should be understood as being examples of problems solved by embodiments of the invention disclosed herein and the invention should not be limited to solving the same/similar problems. The disclosed invention is broadly applicable to address a range of problems beyond those discussed herein.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A production host for hosting virtual machines, comprising:
    a persistent storage storing:
        a backup groupings queue, and
        a backup process stack; and
    a production agent programmed to:
        obtain backup generation requests for the virtual machines; and
        in response to obtaining the backup generation requests:
            generate the backup groupings queue based on the backup generation requests;
            identify a maximum parallelism of the production host based on resources utilized by a portion of the virtual machines specified by the backup groupings queue;
            consolidate the backup groupings queue to generate the backup process stack; and
            generate backups for virtual machines specified by the backup process stack in parallel based on the maximum parallelism.

2. The production host of claim 1, wherein the backup groupings queue comprises an identifier of each virtual machine of the portion of the virtual machines.

3. The production host of claim 2, wherein the backup groupings queue comprises two copies of an identifier of a virtual machine of the portion of the virtual machines.

4. The production host of claim 2, wherein the backup process stack comprises the identifier of each virtual machine of the portion of the virtual machines.

5. The production host of claim 2, wherein each of the identifiers of the backup process stack is unique.

6. The production host of claim 1, wherein obtaining the backup generation requests for the virtual machines comprises:
    during a predetermined period of time:
        receiving the backup generation requests without initiating any backup generations in response to the backup generation requests.

7. The production host of claim 1, wherein generating the backup groupings queue based on the backup generation requests comprises:
    ordering the backup groupings queue in a predetermined order,
    wherein the predetermined order is different from a second order in which the backup generation requests were received.

8. A method for hosting virtual machines, comprising:
    obtaining backup generation requests for the virtual machines; and
    in response to obtaining the backup generation requests:
        generating the backup groupings queue based on the backup generation requests;
        identifying a maximum parallelism of the production host based on resources utilized by a portion of the virtual machines specified by the backup groupings queue;
        consolidating the backup groupings queue to generate a backup process stack; and
        generating backups for virtual machines specified by the backup process stack in parallel based on the maximum parallelism.

9. The method of claim 8, wherein the backup groupings queue comprises an identifier of each virtual machine of the portion of the virtual machines.

10. The method of claim 9, wherein the backup groupings queue comprises two copies of an identifier of a virtual machine of the portion of the virtual machines.

11. The method of claim 9, wherein the backup process stack comprises the identifier of each virtual machine of the portion of the virtual machines.

12. The method of claim 9, wherein each of the identifiers of the backup process stack is unique.

13. The method of claim 8, wherein obtaining the backup generation requests for the virtual machines comprises:
    during a predetermined period of time:
        receiving the backup generation requests without initiating any backup generations in response to the backup generation requests.

14. The method of claim 8, wherein generating the backup groupings queue based on the backup generation requests comprises:
    ordering the backup groupings queue in a predetermined order,
    wherein the predetermined order is different from a second order in which the backup generation requests were received.

15. A non-transitory computer readable medium comprising computer readable program code, which when executed by a computer processor enables the computer processor to perform a method for hosting virtual machines, the method comprising:
    obtaining backup generation requests for the virtual machines; and
    in response to obtaining the backup generation requests:
        generating the backup groupings queue based on the backup generation requests;
        identifying a maximum parallelism of the production host based on resources utilized by a portion of the virtual machines specified by the backup groupings queue;
        consolidating the backup groupings queue to generate a backup process stack; and
        generating backups for virtual machines specified by the backup process stack in parallel based on the maximum parallelism.

16. The non-transitory computer readable medium of claim 15, wherein the backup groupings queue comprises an identifier of each virtual machine of the portion of the virtual machines.

17. The non-transitory computer readable medium of claim 16, wherein the backup groupings queue comprises two copies of an identifier of a virtual machine of the portion of the virtual machines.

18. The non-transitory computer readable medium of claim 16, wherein the backup process stack comprises the identifier of each virtual machine of the portion of the virtual machines.

19. The non-transitory computer readable medium of claim 16, wherein each of the identifiers of the backup process stack is unique.

20. The non-transitory computer readable medium of claim 15, wherein obtaining the backup generation requests for the virtual machines comprises:
during a predetermined period of time:
receiving the backup generation requests without initiating any backup generations in response to the backup generation requests.

* * * * *